Figure 1:
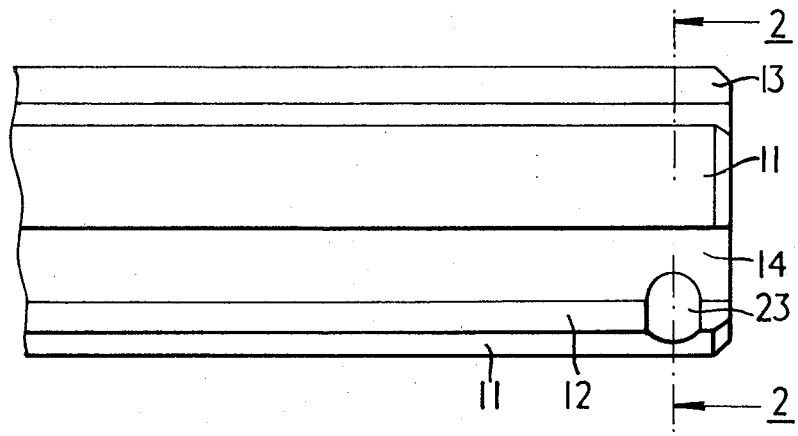

United States Patent [19]
Montefiore, deceased et al.

[11] 3,759,065
[45] Sept. 18, 1973

[54] KEYED JOINT

[76] Inventors: Herbert Ralph Montefiore, deceased, late of "Clifton," Station Rd., West Horndon, Essex; by National Westminster Bank, Limited, executor, 41 Lothbury, London, both of England

[22] Filed: May 7, 1971

[21] Appl. No.: 141,170

[52] U.S. Cl. .................................................. 64/23
[51] Int. Cl. ............................................. F16d 3/06
[58] Field of Search .......................... 64/23, 9, 27.3

[56] References Cited
UNITED STATES PATENTS 3,183,684  5/1965  Zeidler .................................. 64/23
3,494,148  2/1970  Young .................................. 64/23
3,248,900  5/1966  Shurts .................................. 64/23
3,478,541  11/1969  McGill et al. ....................... 64/23.7

Primary Examiner—Edward G. Favors
Attorney—Axel A. Hofgren et al.

[57] ABSTRACT

A keyed joint for enabling relative longitudinal movement to take place between a driving and a driven member under high torque loading conditions includes a shaft member and a coaxial sleeve member. A key is formed on one of the members and a keyway on the other member, the key and keyway each having a face transverse to the circumferential direction and spaced apart circumferentially. A plurality of rollers are located between said faces and the faces are profiled to correspond to the contacting surface of the rollers.

4 Claims, 4 Drawing Figures

Patented Sept. 18, 1973   3,759,065

2 Sheets-Sheet 1

Patented Sept. 18, 1973 3,759,065

2 Sheets-Sheet 2

KEYED JOINT

This invention relates to a keyed joint including a shaft and coaxial sleeve for transmitting torque and providing for relative longitudinal movement between the shaft and sleeve.

Keyed shaft and sleeve joints have been proposed in which the shaft and sleeve are slidable relatively longitudinally to allow adjustment in the spacing between a driving and a driven member. Such joints, which may include splined shafts, often have a high resistance to relative sliding movement under high torque loading.

An object of the invention is to provide a keyed joint in which the resistance to relative longitudinal movement between the shaft and sleeve under torque loading is reduced.

According to the invention a keyed joint, including a shaft member and a coaxial sleeve member arranged for relative longitudinal movement and keyed to prevent relative rotation, comprises at least two sets of keys on one of the members and corresponding sets of keyways on the other of the members, the keys and keyways each having a face transverse to the circumferential direction, the faces being spaced apart circumferentially and locating a plurality of cylindrical rollers between them, said faces being profiled to correspond to the contacting surface of the rollers, which have their axes of rotation extending radially of the shaft and sleeve members.

Preferably the keys are formed on the shaft member and the keyways are formed on the sleeve member.

Conveniently each key and keyway together provide two pairs of said spaced apart transverse faces, and a plurality of rollers are located between the faces of each pair. In this way torque can be applied to the joint in either direction of rotation and, whatever the direction of rotation, relative longitudinal movement of the shaft and sleeve members is obtained by a rolling action of the rollers.

When torque is to be applied to the joint in one direction only, one pair of said spaced apart transverse faces is provided on each key and keyway, a further pair of faces transverse to the circumferential direction being provided on each key and keyway, and said further pair being located closely adjacent one another.

Figure 2:
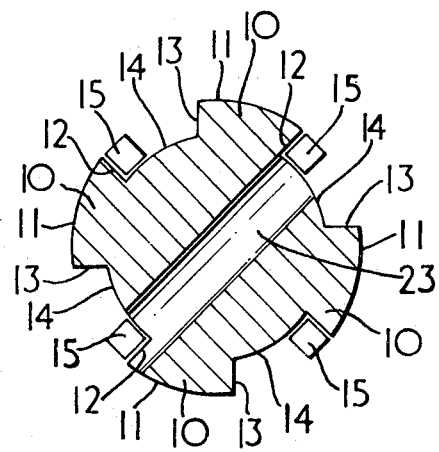
Figure 3:
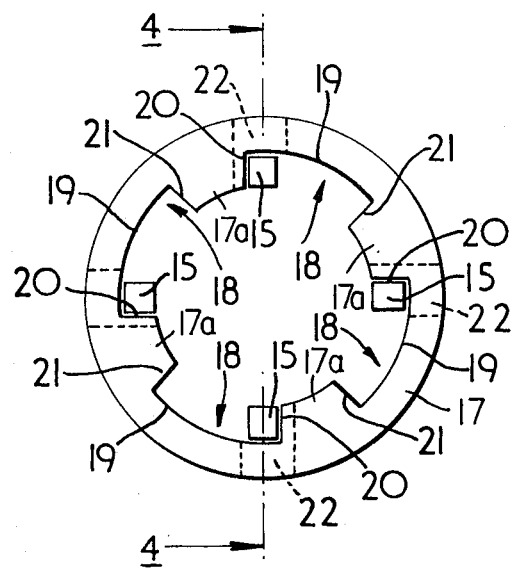

Further features of the invention appear from the following description of an embodiment of the invention given by way of example only and with reference to the drawings, in which:

FIG. 1 is a side elevation of a splined shaft;
FIG. 2 is a section on the line 2—2 in FIG. 1;
FIG. 3 is an end elevation of a sleeve, and
FIG. 4 is a sectional elevation on the line 4—4 in FIG. 3.

Referring to the drawings and firstly to FIGS. 1 and 2 the shaft has four keys or splines 10 regularly spaced circumferentially about the periphery of the shaft. Each spline 10 has a part cylindrical surface 11 bounded by two faces 12 and 13 extending parallel to the axis of the shaft and transverse to the circumferential direction of the shaft. The faces 12 and 13 are flat, and imaginary lines parallel to the faces subtend a small acute angle to radial lines from the axis of the shaft. A part cylindrical surface 14 forms the periphery of the shaft between adjacent splines.

Figure 4:
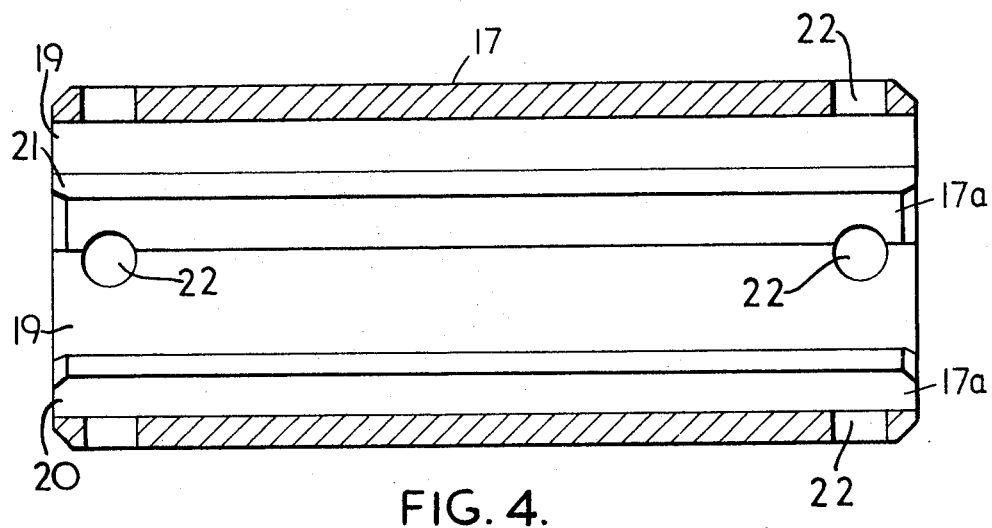

When the shaft of FIGS. 1 and 2 is assembled with the sleeve of FIGS. 3 and 4 to form a joint, cylindrical rollers 15, shown in FIGS. 1 and 2, are located in contact with the faces 12 of the splines 10. The rollers 15 have their axes arranged in alignment with radii from the axis of the shaft and the length of the rollers in their axial direction is equal to the depth of the splines. The surfaces 12 of the splines 10 contacted by the rollers 15 are arranged parallel to the sides of the rollers so that the rollers each have line contact along the whole of their length with the associated surface 12. Several rollers are located spaced apart along and in contact with each of the surfaces 12, the number of rollers provided being dependent on the length of the sleeve and on the torque loading of the joint. It will be appreciated that the more rollers that are provided the lower the load on each roller.

Referring now to FIGS. 3 and 4 which show a cylindrical sleeve 17 arranged to fit onto the shaft shown in FIGS. 1 and 2. The sleeve 17 has internally projecting ribs 17a defining keyways 18 for the keys for splines 10 and each keyway 18 has a part-cylindrical surface 19 with a radius of curvature corresponding to that of the spline surface 11. The surface 19 is bounded by two faces 20 and 21 of two adjacent ribs 17a corresponding to the faces 12 and 13 on the splines 10 and of similar disposition to the surfaces 12 and 13. The rollers 15 contact the faces 20 so that the rollers have line contact along their whole length with the faces 20. The depth of the keyways 18 is the same as the depth of the splines 10.

Lubrication of the splines and keyways and sealing of the joint against the ingress of dirt and moisture may be obtained by the provision of an oiled felt pad (not shown) located around the shaft and shaped to fit over the splines.

The sleeve has four apertures 22 at each end for the location of retaining pins (not shown) for holding the rollers 15 in place between the ends of the sleeves. The retaining pins may be held in place by a band (not shown) encircling the sleeve or the ends of the apertures 22 may be upset for the same purpose.

The shaft has a diametral bore 23 at its free end for locating a retaining pin (not shown) by which the sleeve is retained on the shaft.

It will be appreciated that the arrangement described with reference to the drawings is suitable as a unidirectional joint, i.e., torque is normally transmitted through the joint in one direction only — the anti-clockwise direction as seen in FIGS. 2 and 3. When torque loading of the joint in this direction is taking place relative longitudinal movement of the shaft and sleeve can take place without undue resistance, due to the rolling action of the rollers along the associated transverse faces of the splines and keyways. During torque loading the rollers are subjected to largely compressive forces.

The splines and keyways instead of being parallel to the axis of the shaft may be inclined to said axis.

The joint described with reference to the drawing may be adapted to serve as a bi-directional joint by the provision of rollers between the faces 13 and 21, as well as between the faces 12 and 20. In this arrangement the faces 13 and 21 are spaced circumferentially from one another when the shaft and sleeve are assembled to locate the rollers, and relative movement between the shaft and sleeve is obtained in both directions of rotation in a similar manner.

Preferably the combined length of each row of rollers is half the maximum relative movement between the shaft and the sleeve. At the extremes of said movement the rollers will come up against the retaining pins and will momentarily contact the pins. The rollers then reposition themselves until they are again spaced apart.

The outer diameter of the shaft is as large as can be accommodated in the desired housing so as to minimise torsional deflection. The sleeve is designed so as to match as near as practicable the torsional deflection of the shaft, thereby evening out the load distribution between the rollers.

The joint described is relatively cheap to manufacture and has a relatively long life. Moreover the joint allows relative movement between the shaft and sleeve to take place relatively easily due to the low resistance to this movement even when the joint is under high torsional load.

What I claim as my invention and desire to secure by Letters Patent of the United States is:

1. In a keyed joint which includes a shaft member and a coaxial sleeve member arranged for relative longitudinal movement and keyed to prevent relative rotation so as to transmit rotary driving force from one member to the other, the improvement comprising:
   two sets of keys on one of the members;
   corresponding sets of keyways on the other of the members, the keys and keyways each having faces transverse to the circumference of the members, with pairs of the faces being spaced apart circumferentially;
   and a plurality of rigid cylindrical rollers between each cooperating pair of faces with their axes of rotation effectively on radii of the members;
   each set of keys having two keys located on opposite sides of the axis of rotation of the members from one another, and the keys and keyways of one set being angularly displaced substantially 90° from the keys and keyways of the other set.

2. A keyed joint according to claim 1 wherein the keys are formed on the shaft member and the keyways are formed on the sleeve member.

3. A keyed joint according to claim 1 wherein one pair of said spaced apart transverse faces is provided on each key and co-operating keyway, a further pair of faces transverse to the circumferential direction being provided on each key and cooperating keyway, and said further pair being located closely adjacent one another.

4. In a keyed joint which includes a shaft member and a coaxial sleeve member arranged for relative longitudinal movement and keyed to prevent relative rotation so as to transmit rotary driving force from one member to the other, the improvement comprising:
   a set of keys on one of the members, each of said keys having faces transverse to the circumference of the members;
   a corresponding set of keyways on the other of the members, each of said keyways receiving one of the keys and having faces which are parallel to those of said one of the keys, and cooperating pairs of said parallel faces being spaced apart;
   and a plurality of rigid, cylindrical rollers between each cooperating pair of parallel faces, the axes or rotation of said rollers being parallel to said cooperating pairs of parallel faces, so the rollers make line contact with said faces, and said axes of rotation being effectively on radii of the members,
   said set of keys and corresponding set of keyways including a single key and keyway positioned on one side of a plane through the axis of rotation of the members and substantially 90° from said plane, and at least one key and keyway on the other side of said plane, and said keys and keyways being angularly substantially equidistant from one another.

* * * * *

PO-1050
(5/69)

UNITED STATES PATENT OFFICE
CERTIFICATE OF CORRECTION

Patent No. 3,759,065      Dated September 18, 1973

Inventor(s) Herbert Ralph Montefiore, Deceased, by National Westminster Bank Limited, England It is certified that error appears in the above-identified patent and that said Letters Patent are hereby corrected as shown below:

Page 1, insert the following in the line following the name of the inventor and applicant:

[73] Assignee: Rotary Hoes Limited, a British company, West Horndon,

Essex, England.

Signed and sealed this 16th day of July 1974.

(SEAL)
Attest:

McCOY M. GIBSON, JR.      C. MARSHALL DANN
Attesting Officer      Commissioner of Patents